(12) United States Patent
Schantz

(10) Patent No.: US 6,512,488 B2
(45) Date of Patent: Jan. 28, 2003

(54) APPARATUS FOR ESTABLISHING SIGNAL COUPLING BETWEEN A SIGNAL LINE AND AN ANTENNA STRUCTURE

(75) Inventor: Hans Gregory Schantz, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/912,952

(22) Filed: Jul. 24, 2001

(65) Prior Publication Data

US 2002/0175877 A1 Nov. 28, 2002

Related U.S. Application Data

(62) Division of application No. 09/855,413, filed on May 15, 2001.

(51) Int. Cl.⁷ .................................................. H01Q 9/28
(52) U.S. Cl. ....................................... 343/795; 343/865
(58) Field of Search ........................... 343/700 MS, 767, 343/770, 795, 808, 846, 853, 857, 859, 865; H01Q 9/28, 21/26

(56) References Cited

U.S. PATENT DOCUMENTS

| | | | |
|---|---|---|---|
| 2,239,724 A | 4/1941 | Lindenblad | |
| 2,430,353 A | * 11/1947 | Masters | 343/795 |
| 2,454,766 A | 11/1948 | Brillouin | |
| 3,364,491 A | 1/1968 | Stohr | |
| 4,641,317 A | 2/1987 | Fullerton | |
| 4,743,906 A | 5/1988 | Fullerton | |
| 4,813,057 A | 3/1989 | Fullerton | |
| 4,979,186 A | 12/1990 | Fullerton | |
| 5,319,377 A | 6/1994 | Thomas | |
| 5,363,108 A | 11/1994 | Fullerton | |
| 5,467,098 A | * 11/1995 | Bonebright | 343/767 |
| 5,506,592 A | * 4/1996 | MacDonald et al. | 343/846 |
| 5,677,927 A | 10/1997 | Fullerton et al. | |
| 5,687,169 A | 11/1997 | Fullerton | |
| 5,832,035 A | 11/1998 | Fullerton | |
| 5,872,546 A | * 2/1999 | Ihara et al. | 343/795 |
| 6,342,867 B1 | * 1/2002 | Bell | 343/795 |
| 6,348,898 B1 | * 2/2002 | Rosenbury et al. | 343/786 |
| 6,351,246 B1 | * 2/2002 | McCorkle | 343/795 |

FOREIGN PATENT DOCUMENTS

DE 197 29 664 A1 2/1999

OTHER PUBLICATIONS

PCT International Search Report of Aug. 2, 2002 relating to cited prior art references.

* cited by examiner

*Primary Examiner*—Tho Phan
(74) *Attorney, Agent, or Firm*—Law office of Donald D. Mondul

(57) ABSTRACT

An apparatus for coupling a signal supply with an antenna including first and second elements. The signal supply delivers a signal to the antenna at a connection locus. The first element has a first edge and the second element has a second edge; the connection locus includes part of the first and second edges. The apparatus includes a first and second feed structure. The first feed structure extends a feed distance from the signal supply to the second edge and divides the first element into two lands in spaced relation with the first feed structure to establish a separation distance intermediate the first feed structure and the two lands. The second feed structure couples the signal supply with the first proximal edge. The separation distance establishes a signal transmission structure between the two lands and the first feed structure.

15 Claims, 18 Drawing Sheets

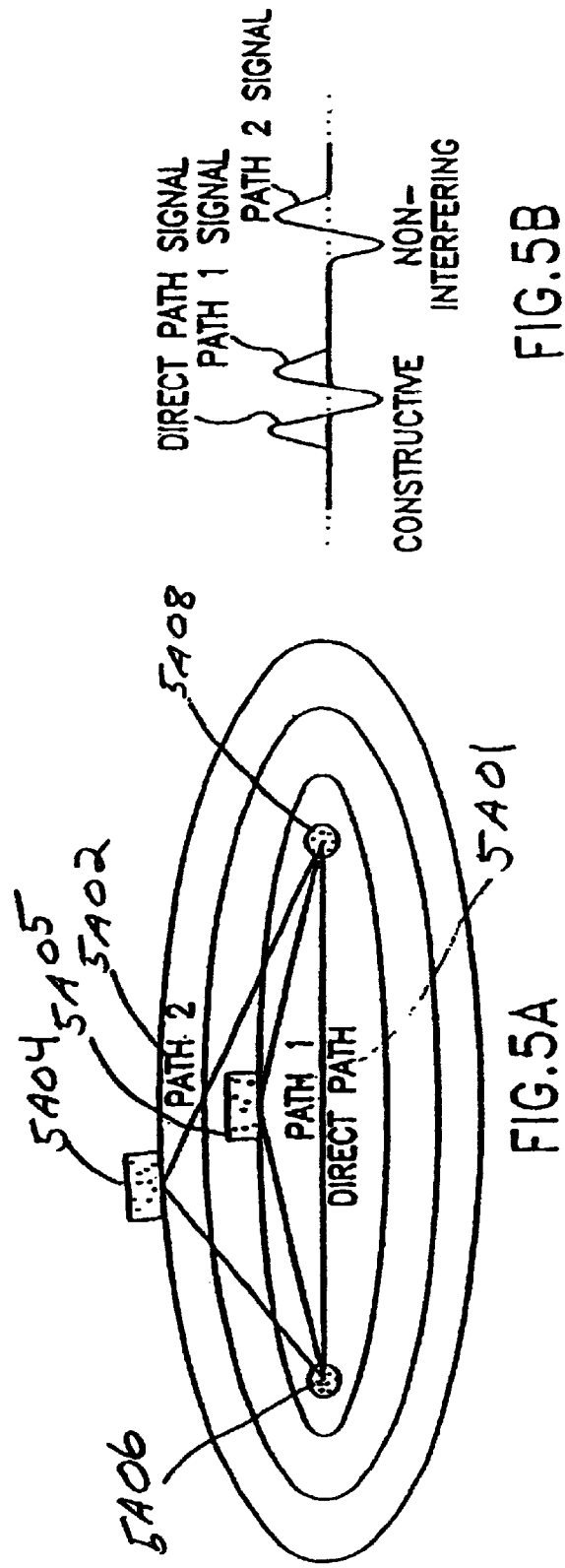

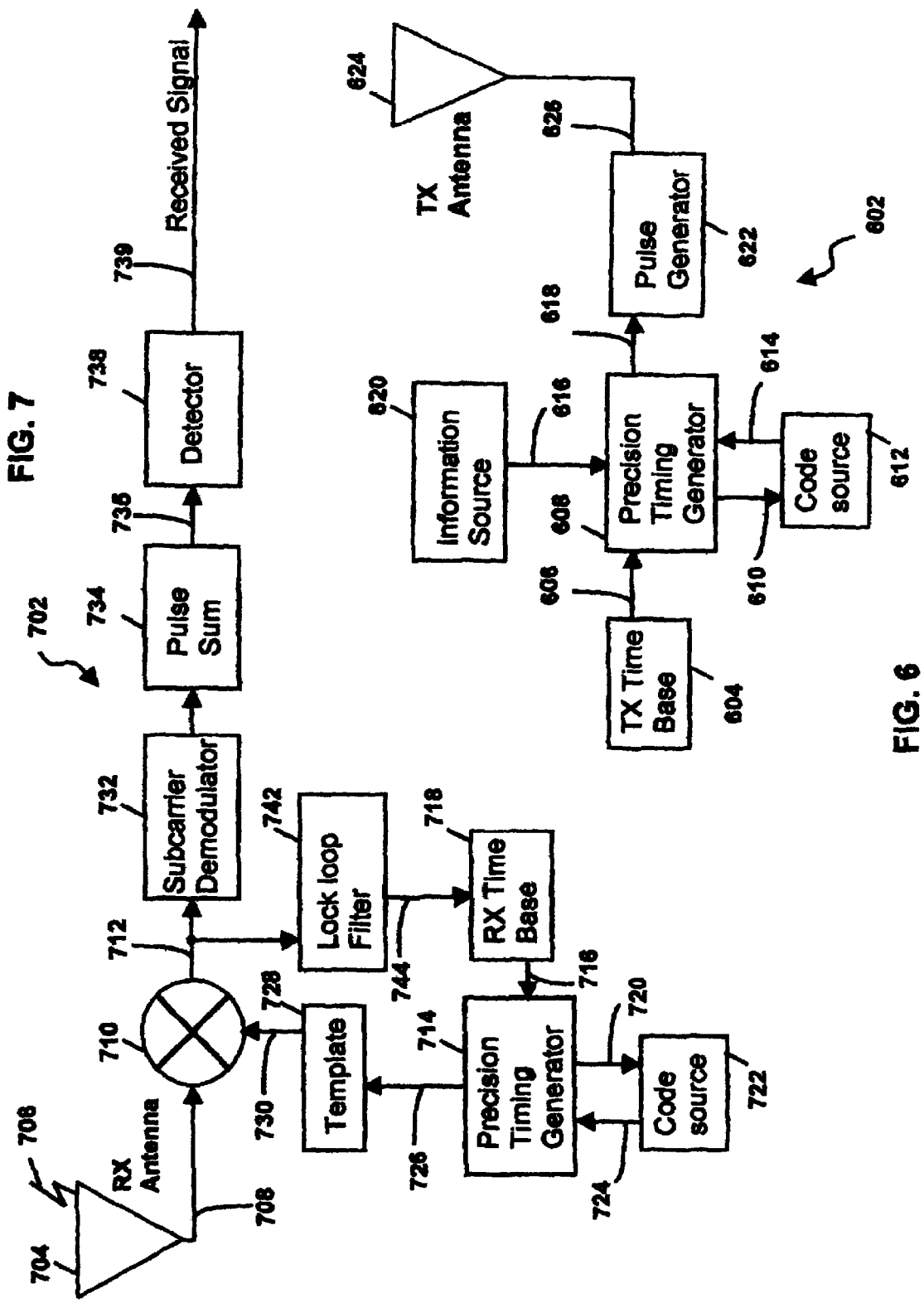

CORRESPONDING
TO EACH
Δt

APPARATUS FOR ESTABLISHING SIGNAL COUPLING BETWEEN A SIGNAL LINE AND AN ANTENNA STRUCTURE

This is a divisional of application U.S. Ser. No. 09/855,413, filed May 15, 2001 pending.

BACKGROUND OF THE INVENTION

1. Field of the Invention

The present invention relates generally to electromagnetic energy radiation and reception, and especially relates to electromagnetic energy radiation and reception effected using impulse radio energy. Still more particularly the present invention provides an antenna with an adjustable-impedance feed that is suited for broadband energy radiation and reception, and particularly well suited for broadband energy radiation and reception employing impulse radio energy.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents include U.S. Pat. Nos. 5,677,927 (issued Oct. 14, 1997) to Fullerton et al; and 5,687,169 (issued Nov. 11, 1997) and 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed Jun. 14, 1999, both of which are assigned to the assignee of the present invention, and both of which are incorporated herein by reference.

Earlier-filed applications relating to impulse radio antenna arts include U.S. patent application Ser. No. 09/652,282, entitled, "Semi-Coaxial Horn", filed Aug. 30, 2000; U.S. patent application Ser. No. 09/670,972, entitled, "Electromagnetic Antenna Apparatus", filed Sep. 27, 2000; U.S. patent application Ser. No. 09/753,243 entitled, "Planar Loop Antenna", filed Jan. 2, 2001; and U.S. patent application Ser. No. 09/753,244, entitled, "Single Element Antenna Apparatus" filed Jan. 2, 2001.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

Antennas having ultra-wide band (UWB) properties are desired for a variety of applications, including impulse radio applications for communications, positioning, and other uses. Historically the principal use of UWB antennas has been in multi-band communication systems. Such multi-band communication systems require an ultra-wide band antenna that can handle narrow band signals at a variety of frequencies.

The recently emerging impulse radio communications technology often referred to as impulse radio has placed different, more stringent requirements on antenna performance. Impulse radio communications uses UWB signals, so an antenna for use in an impulse radio system must transmit or receive (or, transmit and receive) over all frequencies across an ultra-wide band at the same time. Thus, ultra-wide band impulse radio requires that an antenna performs well over ultra-wide bandwidths, but is also non-dispersive of those signals. It is desirable in such UWB impulse radio systems to have an antenna with a phase center that remains fixed as a function of frequency so that radiated and received waveforms are not distorted.

Many of the known UWB antennas do not meet this requirement. The most frequently used class of UWB antennas is a "self similar" frequency independent antenna, such as a log periodic antenna or a spiral antenna. Such antennas rely on a smaller scale portion to radiate higher frequency components, and a larger scale portion to radiate lower frequency components. As a result, different frequency components are radiated from different parts of the antenna, and resulting radiated waveforms are distorted. The distortion thus created can be corrected and compensated for by a variety of techniques known to artisans skilled in radio frequency (RF) design and signal processing. However, such corrective measures and structures add unnecessary complications and expense to overall system design.

Horn-type antennas can be non-dispersive, but they tend to be large, bulky and highly directive. Small element antennas are known, such as bow-tie antennas, but they tend to have excessive reflections that can be offset only by resistive loading. Resistive loading is a lossy solution that minimizes reflection at the cost of lowering radiation efficiency. Non-resistive loaded small element antennas have been disclosed in U.S. Pat. No. 5,363,108 (issued Nov. 8, 1994) to Larry W. Fullerton. These antennas emit a short non-dispersive pulse, but tend to have significant reflections and less than desirable impedance matching.

There is a need for a small omni-directional antenna that can radiate energy efficiently with minimal reflection and distortion.

In particular, there is a need for a small omni-directional planar dipole antenna that can radiate energy efficiently with minimal reflection and distortion.

SUMMARY OF THE INVENTION

An apparatus for establishing signal coupling between a signal supply and an antenna structure that includes a first radiating element and a second radiating element. The signal supply delivers a signal to the antenna structure at a connection locus. The first radiating element has a first proximal edge and a first distal edge with respect to the signal supply in an installed orientation. The second radiating element has a second proximal edge and a second distal edge with respect to the signal supply in the installed orientation. The connection locus generally includes a portion of the first proximal edge and the second proximal edge. The apparatus includes: (a) a first feed structure extending a feed distance from the signal supply in the installed orientation to the second proximal edge. The first feed structure substantially divides the first radiating element into at least two electrically common lands in spaced relation with the first feed structure to establish a separation distance intermediate the first feed structure and the at least two lands on two sides of the first feed structure substantially along the feed distance. (b) a second feed structure coupling the signal supply with the first proximal edge. The separation distance is dimensioned appropriately to establish a signal transmission structure between the at least two lands and the first feed structure. The A geometry of the signal transmission structure may be varied along its length so as to establish a desired impedance transformation intermediate the first and second feed structures.

It is therefore an object of the present invention to provide a small omni-directional antenna that can radiate energy efficiently with minimal reflection and distortion.

It is a further object of the present invention to provide a small omni-directional planar dipole antenna that can radiate energy efficiently with minimal reflection and distortion.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 5A illustrates a typical geometrical configuration giving rise to multipath received signals.

FIG. 5B illustrates exemplary multipath signals in the time domain.

FIG. 6 illustrates a representative impulse radio transmitter functional diagram.

FIG. 7 illustrates a representative impulse radio receiver functional diagram.

DETAILED DESCRIPTION OF THE EMBODIMENTS

Overview of the Invention

Figure 1B:
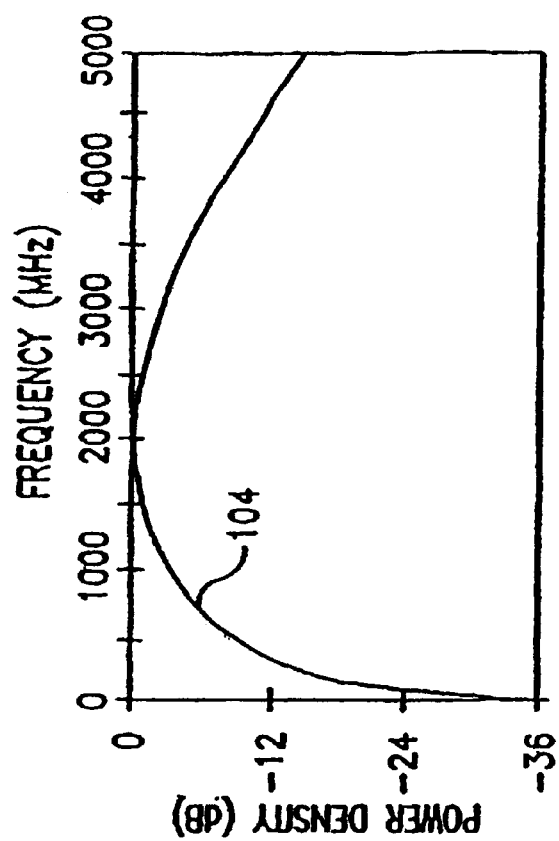
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a usefuil degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been usefuil is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
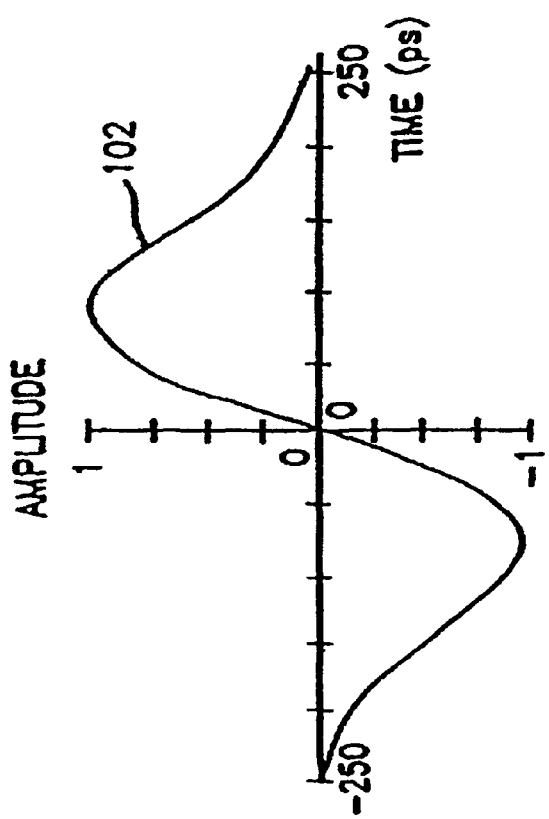
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
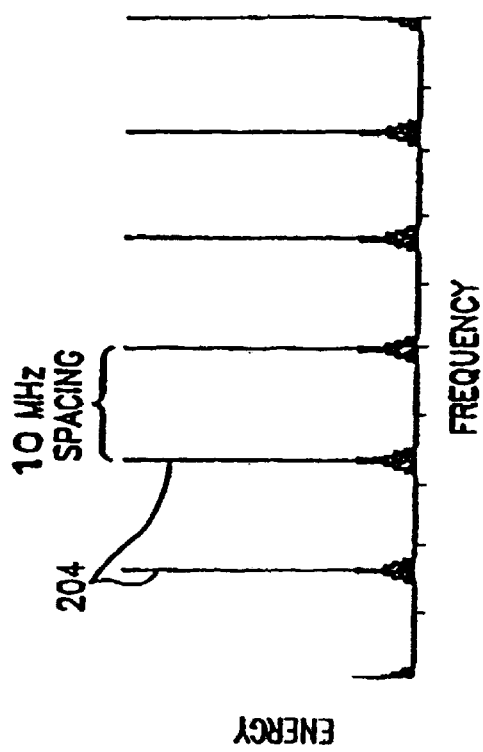
FIG. 2B illustrates the frequency domain amplitude of the waveform of FIG. 2A.
Figure 2A:
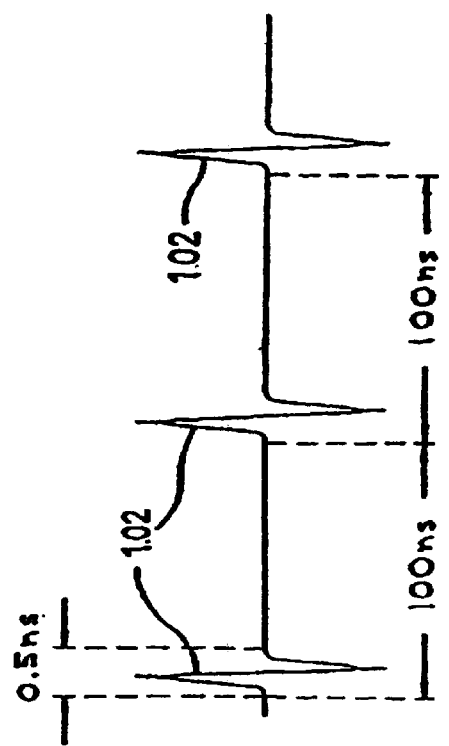
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
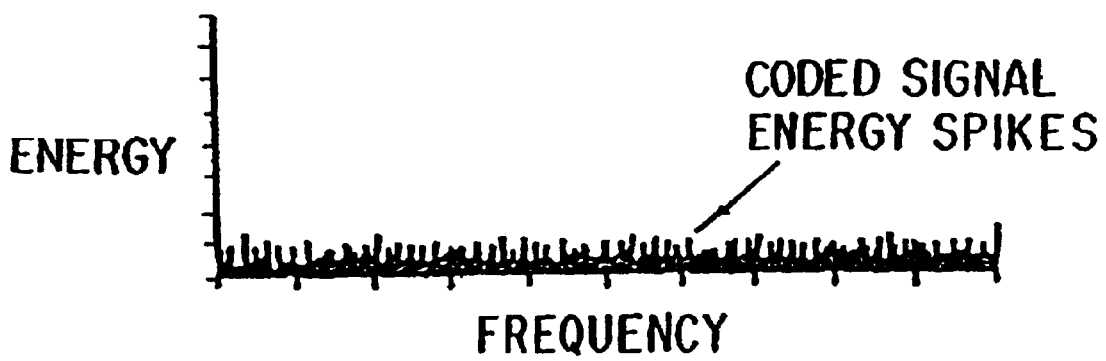
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
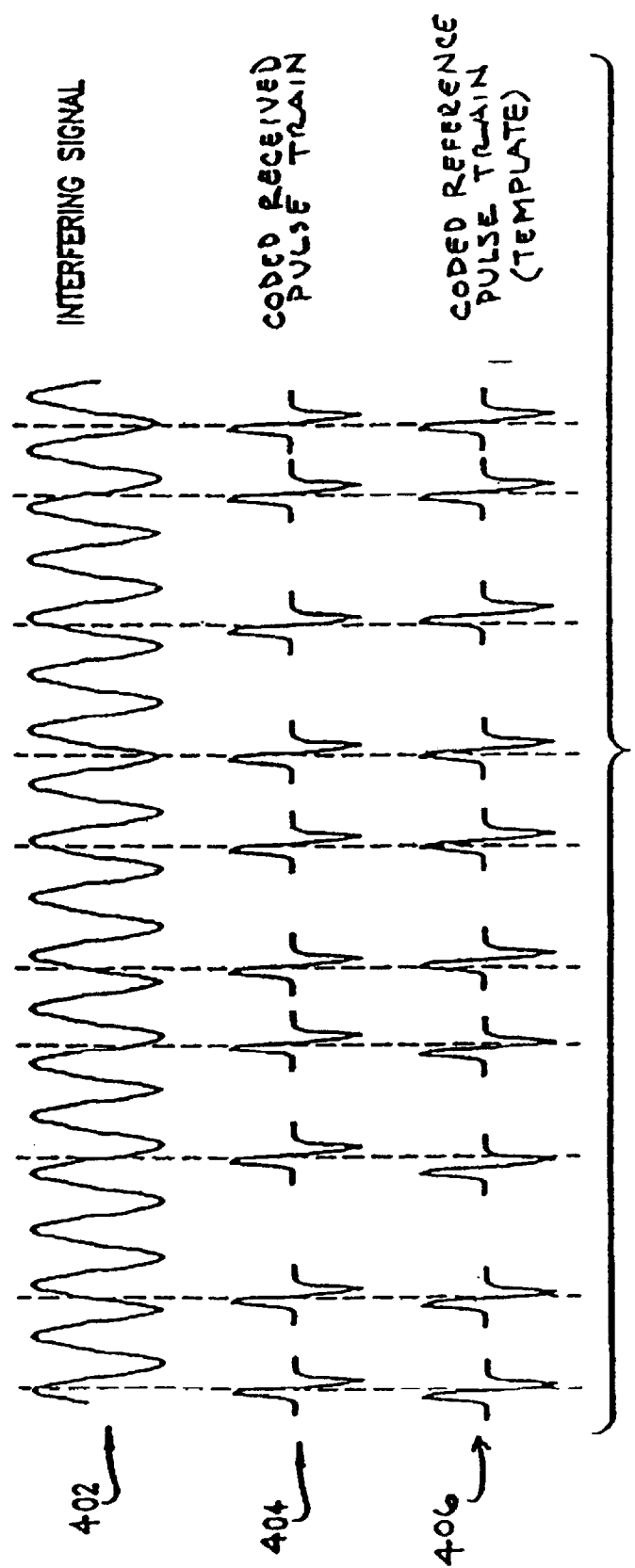
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
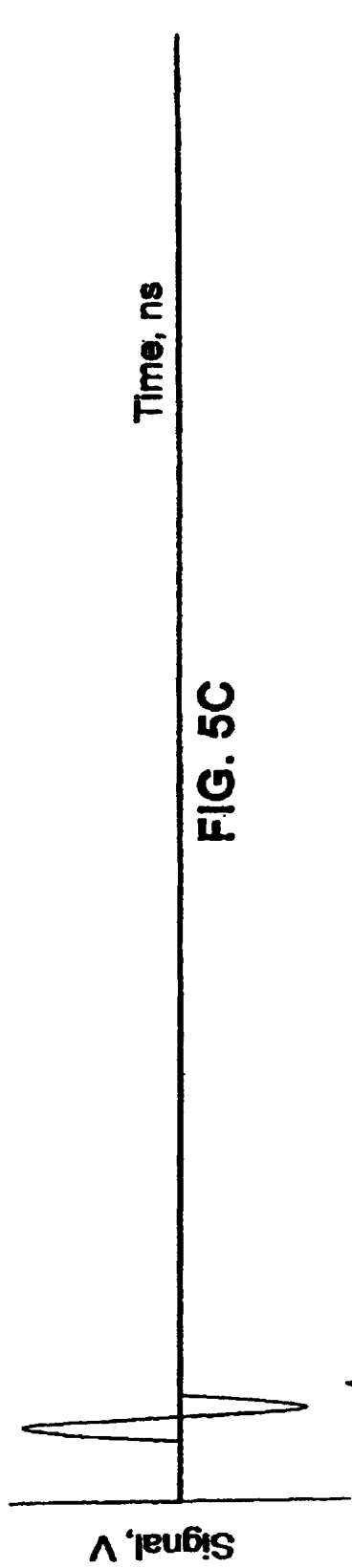
FIGS. 5C–5E illustrate a signal plot of various multipath environments.
Figure 5D:
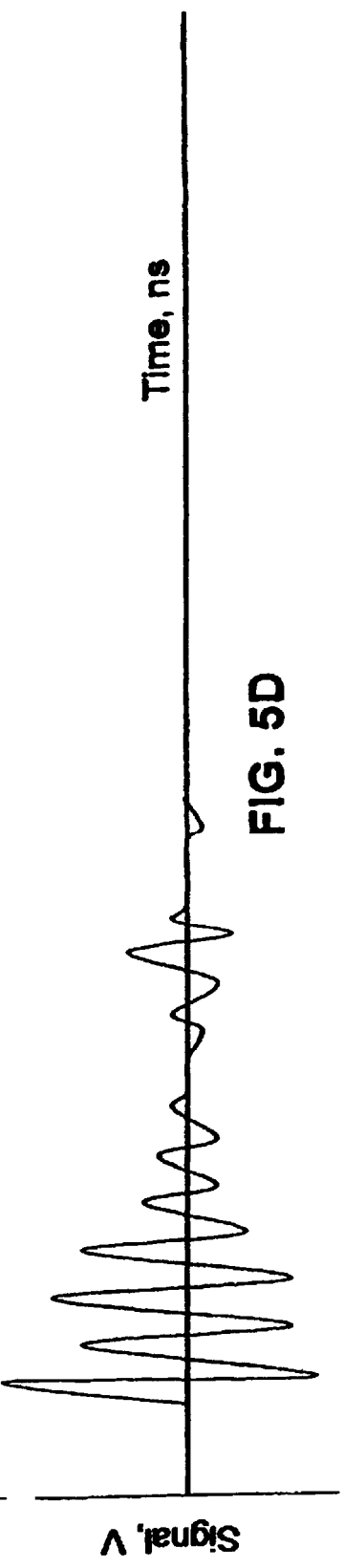
Figure 5E:
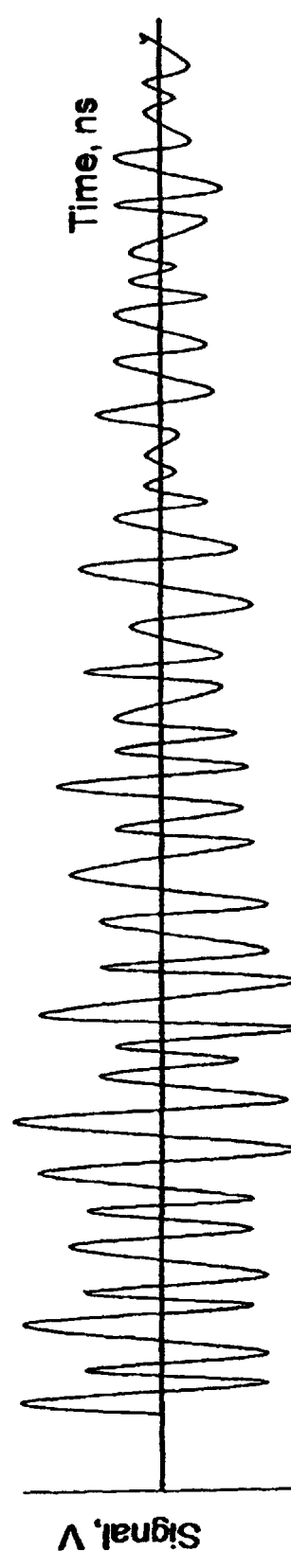

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of mulitpath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2}\sigma^2$ is the RMS amplitude of the combined multipath signals.

Figure 5F:
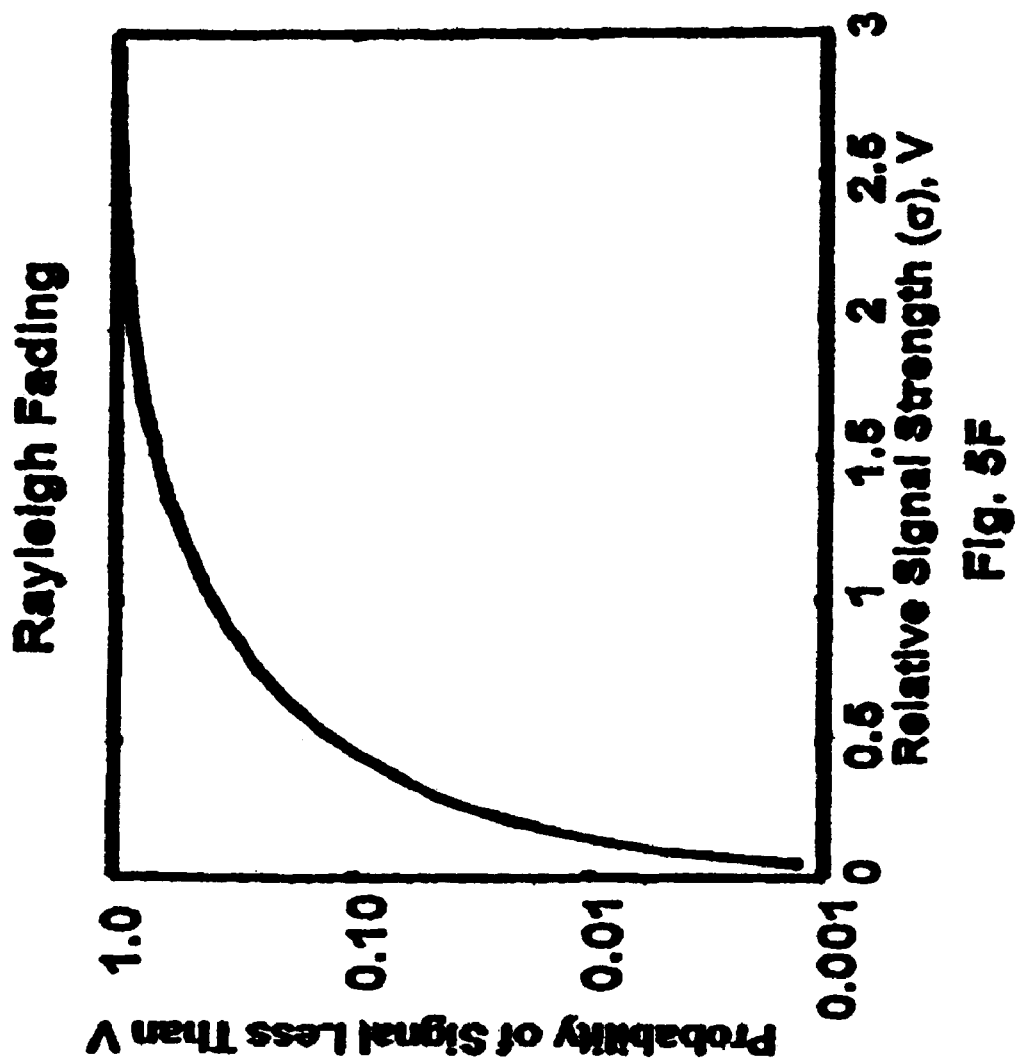
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
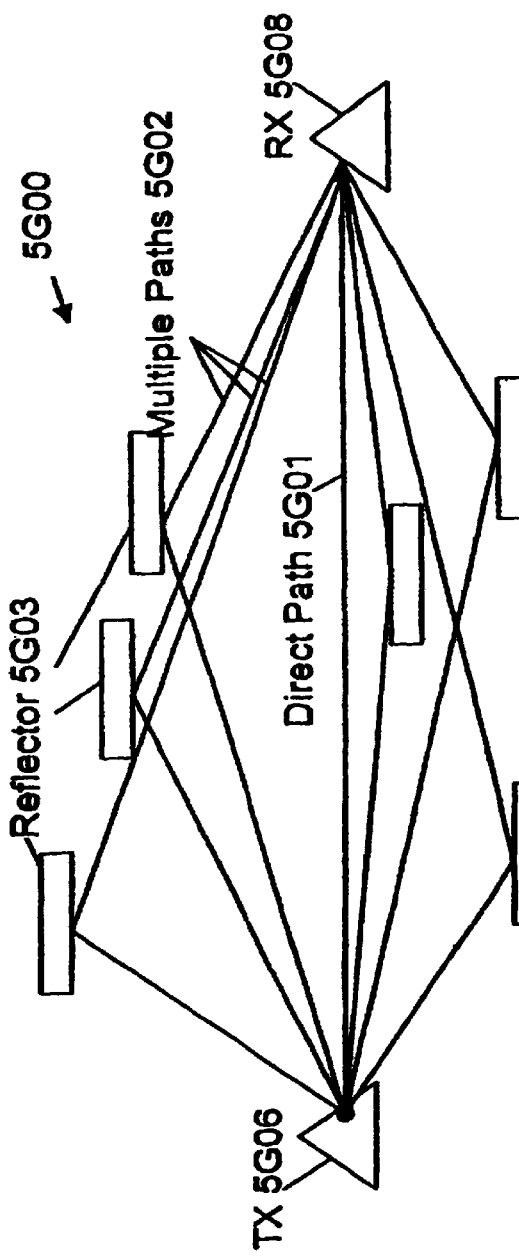
FIG. 5G illustrates a plurality of multipaths with a plurality of reflectors from a transmitter to a receiver.
Figure 5H:
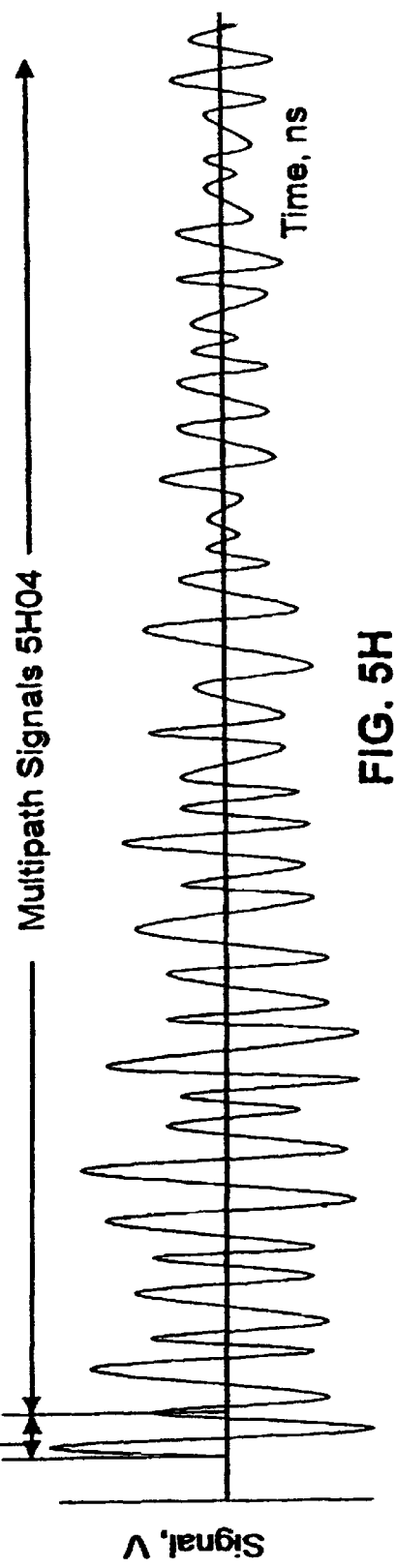
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications 09/045,929, filed Mar. 23, 1998, titled "Ultrawide-Band Position Determination System and Method", and 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
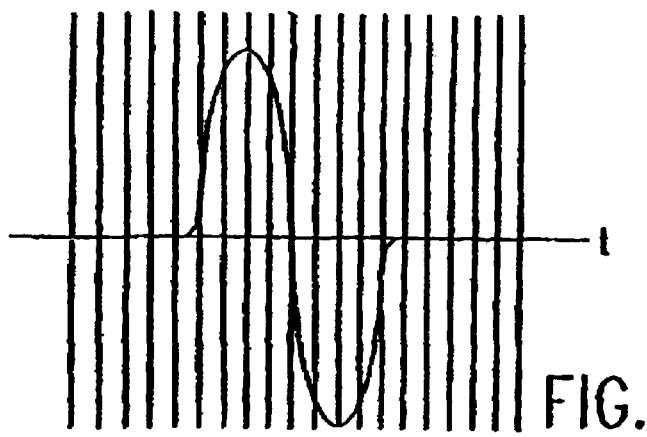
FIG. 8A illustrates a representative received pulse signal at the input to the correlator.
Figure 8B:
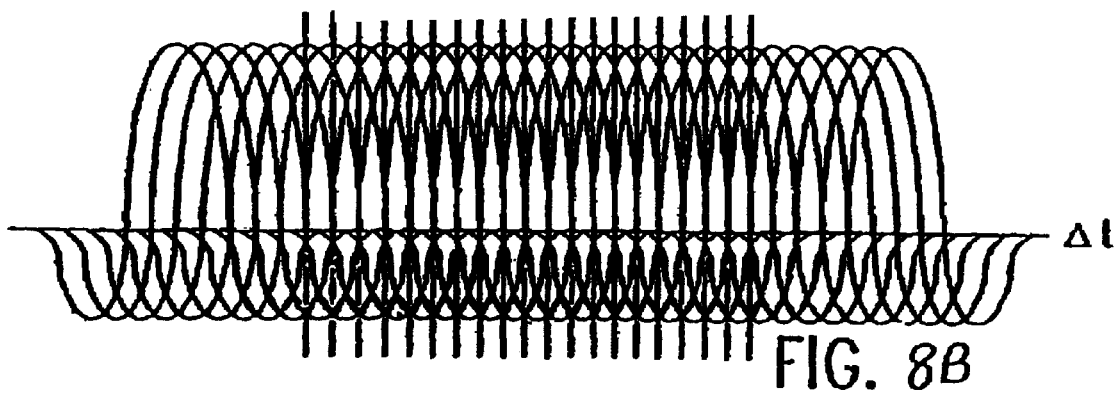
FIG. 8B illustrates a sequence of representative impulse signals in the correlation process.
Figure 8C:
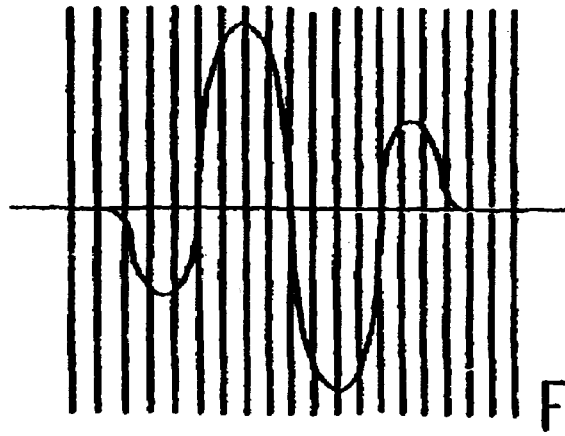
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application 09/146,524, filed Sep. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. Antennas employed in such impulse radio communication systems (as well as in other impulse radio systems, such as positioning systems or other systems) have special requirements for effecting efficient operation. Conflicting design parameters for design goals such as improving uniformity of antenna propagation pattern improving impedance matching and improving antenna gain may be partially accommodated by employing a novel signal coupling apparatus according to the present invention.

DETAILED DESCRIPTION OF THE PREFERRED EMBODIMENT

As mentioned earlier herein in the Summary of the Invention, an object of the present invention to provide a small omni-directional planar dipole antenna that can radiate energy efficiently with minimal reflection and distortion. One attempt at providing such an antenna is presented by U.S. Pat. No. 5,319,377 by Mike Thomas for "Wideband Arrayable Planar Radiator", issued Jun. 7, 1994 (hereinafter referred to as "Thomas"). Thomas discloses a circular planar dipole antenna for use with a multi-band discrete frequency system. Thomas discloses that a circular shape for his antenna elements provides a propagation pattern in which "the majority of generated waves propagate perpendicular to the plane of the antenna element" [Thomas; Col. 3, Lines 49–51]. The inventor has discovered that this conclusion by Thomas is erroneous. The present provides a structure that improves on Thomas' design in several ways.

The inventor has discovered that deviating from the circular shape of Thomas' design provides improved impedance matching properties to dipole antennas. In particular, within limits, greater eccentricity of radiating elements provides a better impedance match and reduces undesired reflections.

FIGS. 9(A) through (D) are schematic illustrations of representative planar dipole antennas with elliptical elements having various ratios of major-to-minor axes. In FIGS. 9(A)–(D), a plurality of differently shaped radiating elements in a variety of dipole antenna devices are illustrated on a common major axes 910, 912 and respective minor axes 914a, 914b, 914c, 914d. In particular, in FIG. 9(A), a planar dipole antenna device 920 includes substantially similar, and preferably substantially congruent radiating elements 922, 924. Radiating element 922 is oriented about major axis 910 and minor axis 914a. Radiating element 922 has a minor axis dimension ma and a major axis dimension $M_a$. Radiating element 924 is oriented about major axis 912 and minor axis 914a. Radiating element 924 has a minor axis dimension $m_a$ and a major axis dimension $M_a$. Radiating elements 922, 924 are separated by a gap G. For radiating elements 922, 924, $m_a$ is equal with $M_a$; radiating elements 922, 924 are circular radiating elements similar to the antenna elements disclosed by Thomas.

In FIG. 9(B), a planar dipole antenna device 930 includes substantially congruent radiating elements 932, 934. Radiating element 932 is oriented about major axis 910 and minor axis 914b. Radiating element 932 has a minor axis dimension $m_b$ and a major axis dimension $M_b$. Radiating element 934 is oriented about major axis 912 and minor axis 914b. Radiating element 934 has a minor axis dimension $m_b$ and a major axis dimension $M_b$. Radiating elements 932, 934 are separated by a gap G. For radiating elements 932, 934, $m_b$ is related to $M_b$ according to the following relation:

$$M_b:m_b \text{ as } 1.25:1$$

Thus, radiating elements 932, 934 are elliptical radiating elements having a greater dimension along axes 910, 912 than the dimension along axis 914b.

In FIG. 9(C), a planar dipole antenna device 940 includes substantially congruent radiating elements 942, 944. Radiating element 942 is oriented about major axis 910 and minor axis 914c. Radiating element 942 has a minor axis dimension $m_c$ and a major axis dimension $M_c$. Radiating element 944 is oriented about major axis 912 and minor axis 914c. Radiating element 944 has a minor axis dimension $m_c$ and a major axis dimension $M_c$. Radiating elements 942, 944 are separated by a gap G. For radiating elements 942, 944, $m_c$ is related to $M_c$ according to the following relation:

$$M_c:m_c \text{ as } 1.50:1$$

Thus, radiating elements 942, 944 are elliptical radiating elements having a greater dimension along axes 910, 912 than the dimension along axis 914c.

In FIG. 9(D), a planar dipole antenna device 950 includes substantially congruent radiating elements 952, 954. Radiating element 952 is oriented about major axis 910 and minor axis 914d. Radiating element 952 has a minor axis dimension $m_d$ and a major axis dimension $M_d$. Radiating element 954 is oriented about major axis 912 and minor axis 914d. Radiating element 954 has a minor axis dimension $m_d$ and a major axis dimension $M_d$. Radiating elements 952, 954 are separated by a gap G. For radiating elements 952, 954, $m_d$ is related to $M_d$ according to the following relation:

$$M_d:m_d \text{ as } 1.75:1$$

Thus, radiating elements 952, 954 are elliptical radiating elements having a greater dimension along axes 910, 912 than the dimension along axis 914d.

Figure 10:
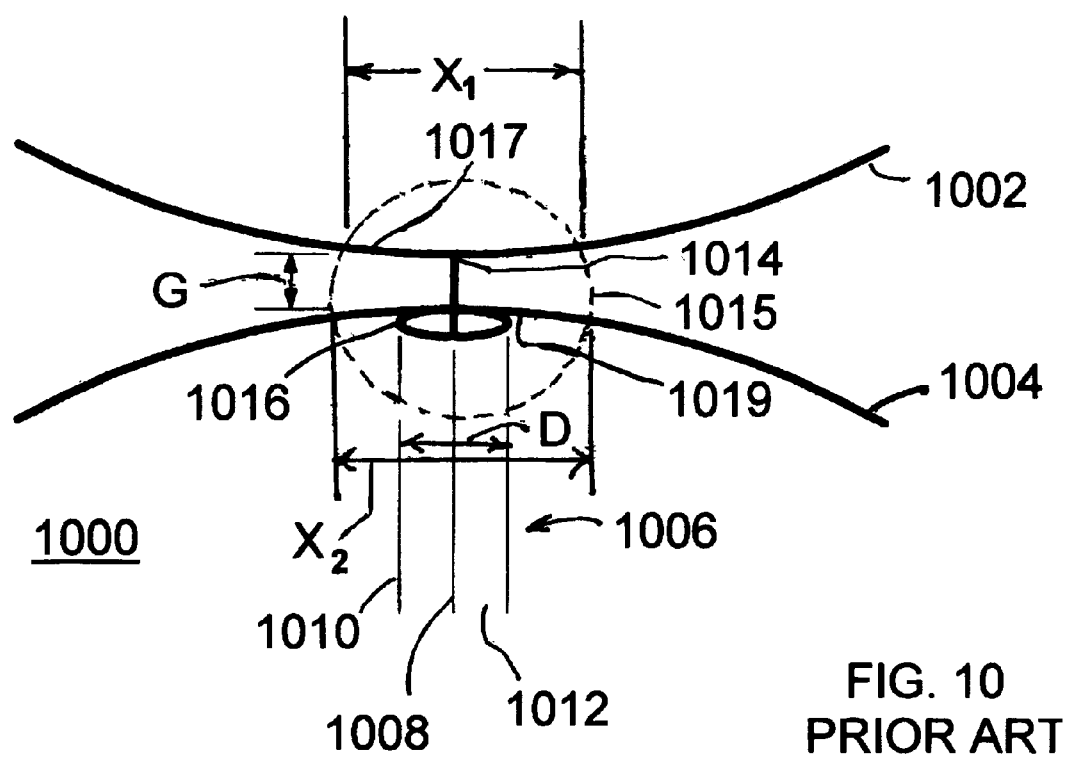
FIG. 10 is a schematic diagram of detail of an antenna feed structure for a spheroidal dipole antenna.

FIG. 10 is a schematic diagram of detail of an antenna feed structure for a spheroidal dipole antenna. In FIG. 10, a spheroidal dipole antenna 1000 includes a first spheroidal radiating element 1002, a second spheroidal radiating element 1004 and a feed structure 1006. Feed structure 1006 is illustrated as a coaxial feed structure including a center conductor 1008 substantially surrounded by a sleeve 1010. A space 1012 between center conductor 1008 and sleeve 1010 may be occupied by air or by a dielectric material. Illustrating feed structure 1006 as a coaxial feed structure is merely illustrative and is not intended to limit the variety of transmission lines or connectors that could be employed in constructing feed structure 1006. A feed structure that is oriented substantially about the axis of an antenna is generally preferred because energy flow and surface currents are minimized at the axial locus.

Feed structure 1006 is coupled with antenna 1000 in a feed region 1015. Center conductor 1008 is connected with first radiating element 1002 at a feed point 1014 within feed region 1015, and sleeve 1010 is connected with second radiating element 1004 at a connection locus 1016 within feed region 1015. If additional mechanical strength or improved resistance to electrical breakdown is desired, dielectric material may be included in feed region 1015.

Variation in overall spheroidal geometry of radiating elements 1002, 1004 of antenna 1000 may be accommodated without significantly affecting the performance of antenna 1000. The inventor has learned that feed region 1015 is critical to provide good matching and minimal reflection while operating antenna 1000. Prior art teaching has generally asserted that a region at which an antenna is connected with its feed should be point-like at a feed point and flare out from that feed point. The present invention incorporates an antenna feed region having a "blunt" or curved surface at a feed point, such as curved surface 1017 spanning a dimension "$X_1$" about feed point 1014, and curved surface 1019 spanning a dimension "$X_2$" about feed locus 1016 within feed region 1015. The inventor has learned that it is advantageous to provide an approximately spheroidal surface for connecting feed structure 1006. Such curved surfaces 1017, 1019 at an antenna feed point 1014 or an antenna feed locus 1016 significantly improve the impedance match of the juncture between feed structure 1006 and radiating elements 1002, 1004 within feed region 1015, thereby providing an improved match to 50 Ω that is not so easily attainable using prior art antenna feed arrangements (if such a preferred low impedance is attainable at all).

A gap width "G" between radiating elements 1002, 1004 is established by the arrangement illustrated in FIG. 10. Gap width G is a critical parameter that must be carefully arranged for providing best results using antenna 1000. A gap width G approximately equal to diameter D of feed structure 1006 is a preferred starting dimension for beginning adjustments to optimize performance.

In exemplary antenna 1000, feed structure 1006 embodies an energy guiding means, radiating elements 1002, 1004 cooperate to embody an energy channeling structure and feed region 1015 embodies a transition means.

FIG. 11(A) is a side view of a right angle coaxial connector feed structure with a planar antenna. In FIG. 11(A), an antenna assembly 1100 includes a dielectric substrate 1102 carrying a first radiating element 1104 and a second radiating element 1106. A coaxial connector 1108 provides a connection structure 1110 for a coaxial cable (not shown in FIG. 11(A)), and a right-angle structure 1112. Coaxial connector 1108 is affixed with dielectric substrate 1102 incorporating spacer structure 1114. Spacer structure 1114 may, for example, include a plurality of nylon spacers, or another spacer structure appropriate to establish a gap dimension "X" from dielectric substrate 1102 appropriate for proper antenna operation by antenna assembly 1100. Ground pins 1116 (only one ground pin 1116 is visible in FIG. 11(A)) connect first radiating element 1104 with coaxial connector 1108. Center pin 1120 connects second radiating element 1106 with the center connector wire of the coaxial cable (not shown in FIG. 11(A)) attached using coaxial connector 1108.

FIG. 11(B) is a side view of a straight coaxial connector feed structure with a planar antenna. In FIG. 11(B), an antenna assembly 1150 includes a dielectric substrate 1152 carrying a first radiating element 1154 and a second radiating element 1156. A coaxial connector 1158 provides a connection structure 1160 for a coaxial cable (not shown in FIG. 11(B)). Coaxial connector 1158 is affixed with dielectric substrate 1152 incorporating spacer structure 1164. Spacer structure 1164 may, for example, include a plurality of nylon spacers, or another spacer structure appropriate to establish a gap dimension "X" from dielectric substrate 1152 appropriate for proper antenna operation by antenna assembly 1150. Ground pins 1166 (only one ground pin 1166 is visible in FIG. 11(B)) connect first radiating element 1154 with coaxial connector 1158. Center pin 1170 connects second radiating element 1156 with the center connector wire of the coaxial cable (not shown in FIG. 11(B)) attached using coaxial connector 1158.

FIG. 11(C) is a top view of a curved feed interface arrangement for an antenna of the sort illustrated in FIG. 11(A) or FIG. 11(B) taken along Section 11C—11C of FIG. 11(A) or FIG. (B). In FIG. 11(C), radiating elements 1104, 1106 are carried upon dielectric substrate 1102. In feed region 1115, ground pins 1116 are connected with first radiating element 1104, and center pin 1120 is connected with second radiating element 1106. Connection may be effected using solder or other known connection techniques. A gap G is established between radiating elements 1104, 1106.

Figure 11:
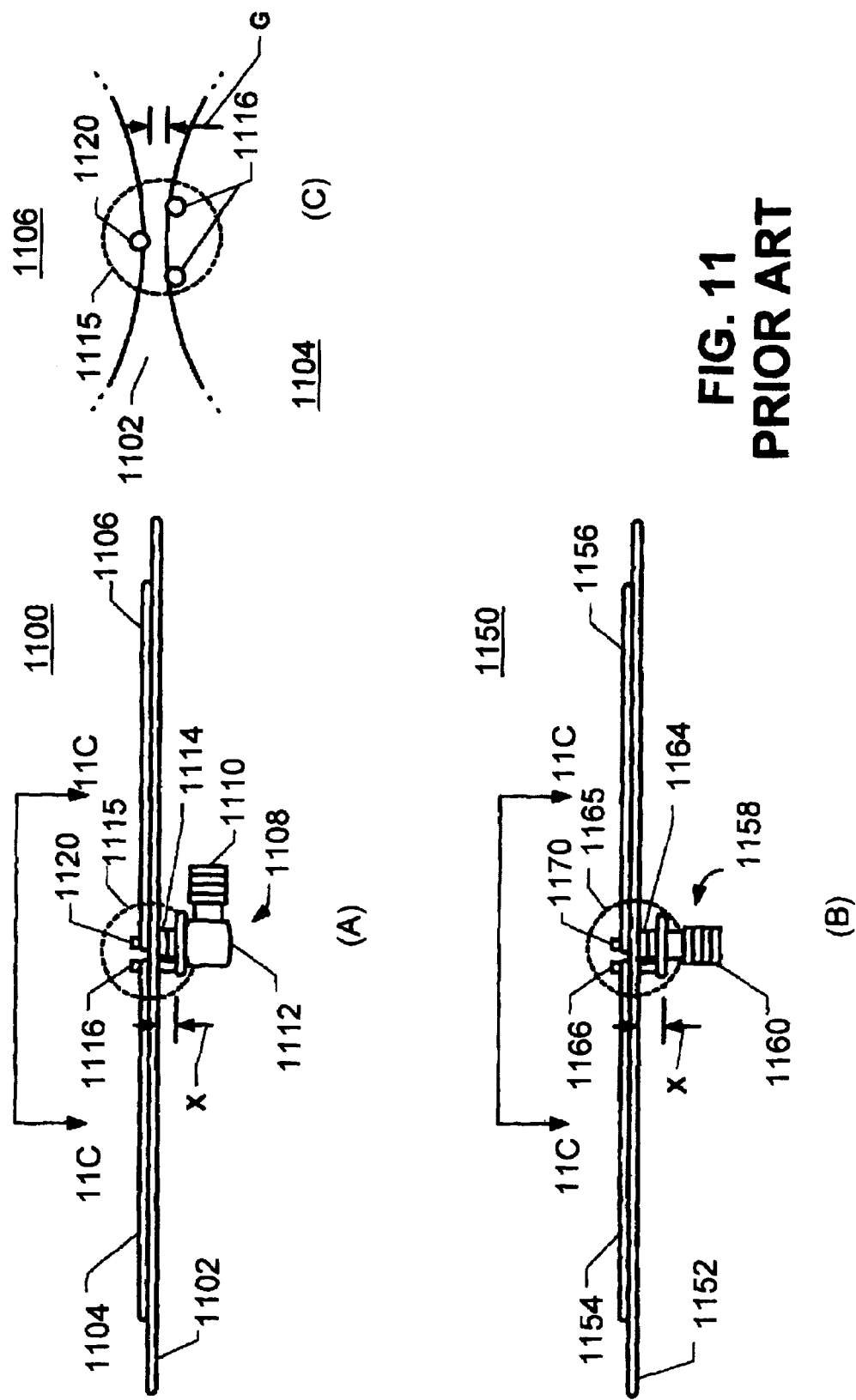
FIG. 11(A) is a side view of a right angle coaxial connector feed structure with a planar antenna.
FIG. 11(B) is a side view of a straight coaxial connector feed structure with a planar antenna
FIG. 11(C) is a top view of a curved feed interface arrangement for an antenna of the sort illustrated in FIG. 11(A) or FIG. 11(B) taken along Section 11C—11C of FIG. 11(A) or FIG. 11(B).
Figure 12:
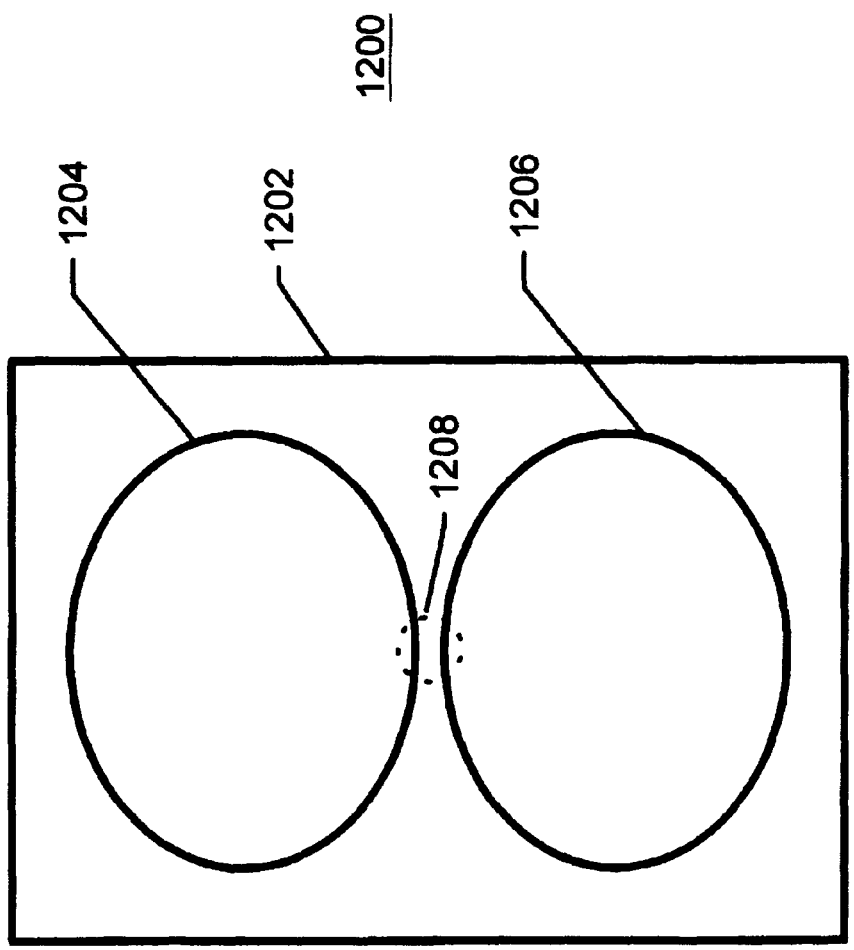
FIG. 12 is a schematic plan view of a planar antenna configured according to the construction illustrated in FIG. 11.

FIG. 12 is a schematic plan view of a planar antenna configured according to the construction illustrated in FIG. 11. In FIG. 12, an antenna assembly 1200 includes a substantially planar substrate 1202 and radiating elements 1204, 1206 arrayed on substrate 1202. Radiating elements 1204, 1206 are preferably substantially planar and made of electrically conductive material, such as copper. Radiating elements 1202, 1204 are preferably adhered to or otherwise affixed upon substrate 1202. Radiating elements are coupled with a signal supply 1208. Signal supply 1208 is preferably a coaxial signal line of the sort represented in FIG. 11 (coaxial connectors 1108, 1158) and connected with radiating elements 1204, 1206 in a manner of the sort described in detail in FIG. 11. For some applications, it may be desirable for antenna assembly 1200 to be conformal to a curved or other non-planar surface. Substrate 1202 may be a flexible printed circuit board or other dielectric such as a glass window, fiberglass panel, plastic pipe, or any other suitable dielectric material.

Figure 9:
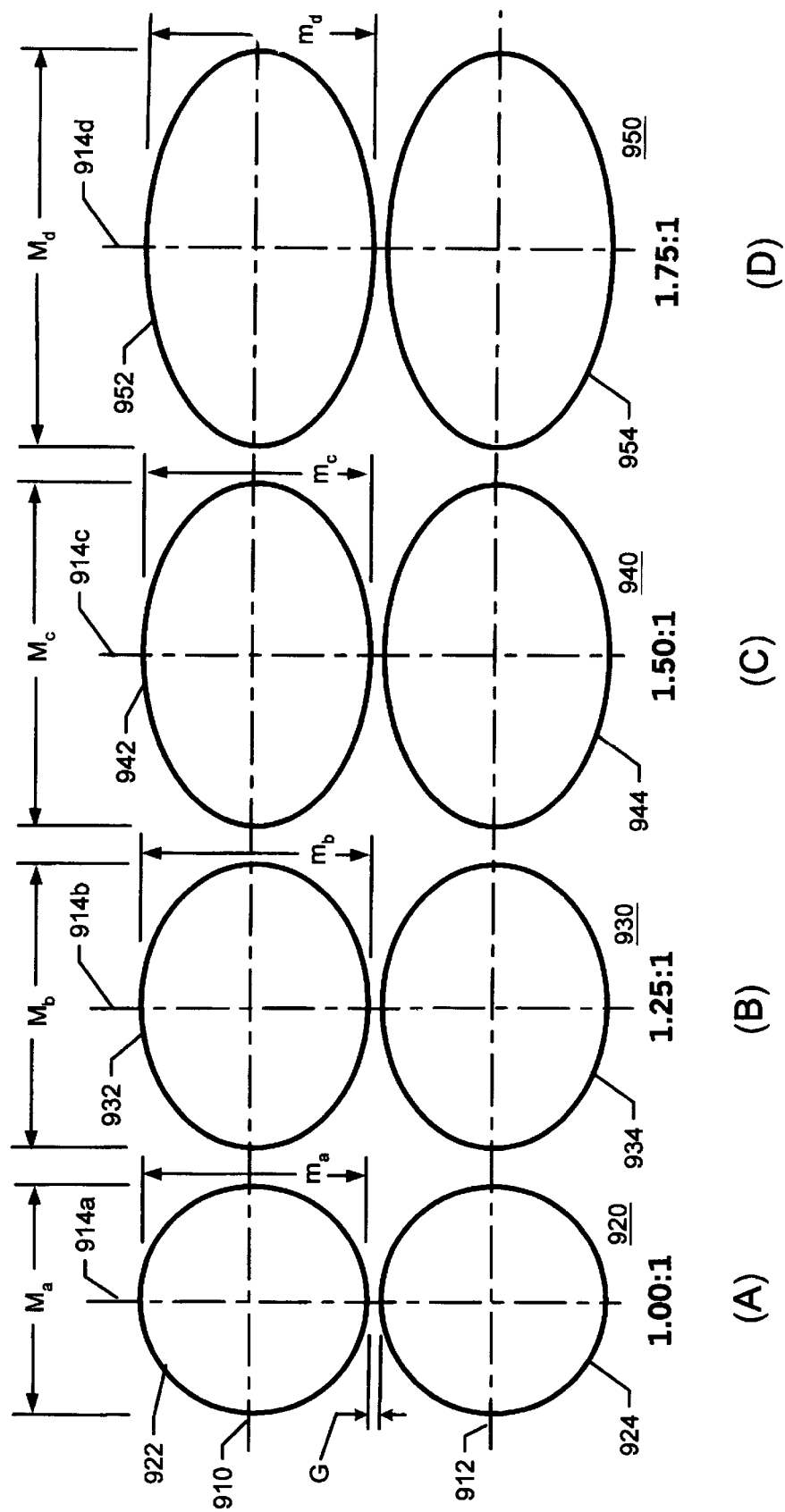
FIGS. 9(A) through (D) are schematic illustrations of representative planar dipole antennas with elliptical elements having various ratios of major-to-minor axes.

The inventor has discovered that a more uniform pattern of propagation about the axis of the antenna elements (e.g., axis 914a of antenna radiating elements 922, 924; FIG. 9) is produced using less eccentric radiating elements. In the case of circular elements, the radiation is essentially omni-directional. Thomas mistakenly teaches that radiation from circular elements propagates principally perpendicular to the plane of the radiating elements. The lesson from experiments by the inventor teach that directivity in a direction parallel to the plane containing the radiating elements is enhanced by eccentricity of the radiating elements. That is, a greater eccentricity of radiating elements produces greater directivity of propagation parallel to the plane containing the radiating elements. The result of such greater directivity of propagation parallel to the plane containing the radiating elements is that the entire propagation pattern for such eccentric elements is less uniformly omni-diorectional and more likely to exhibit lobes of radiation intensity that disrupt uniformity of the radiation parttern. Conversely, lesser eccentricity (i.e., greater circularity) of radiating elements produces improved uniformity of propagation of signals; i.e., more omni-directional propagation.

Moreover, greater eccentricity presents a broader, more gradual transition from signal supply to antenna elements in the feed region so that greater eccentricity yields better impedance matching, less signal reflection and an improves voltage standing wave ratio (VSWR).

The goal of producing an omni-directional antenna is incompatible with the goal of reducing reflection and improving impedance matching. Lesser eccentricity of antenna elements produces greater directional pattern; increased eccentricity of antenna elements produces improved impedance matching and reduced signal reflection. Thus, there is a dichotomous relation involved in antenna design as it pertains to dipole antennas and eccentricity of radiating elements in such antennas. The present invention provides greater freedom of design in connection with this dichotomous relation.

Figure 13:
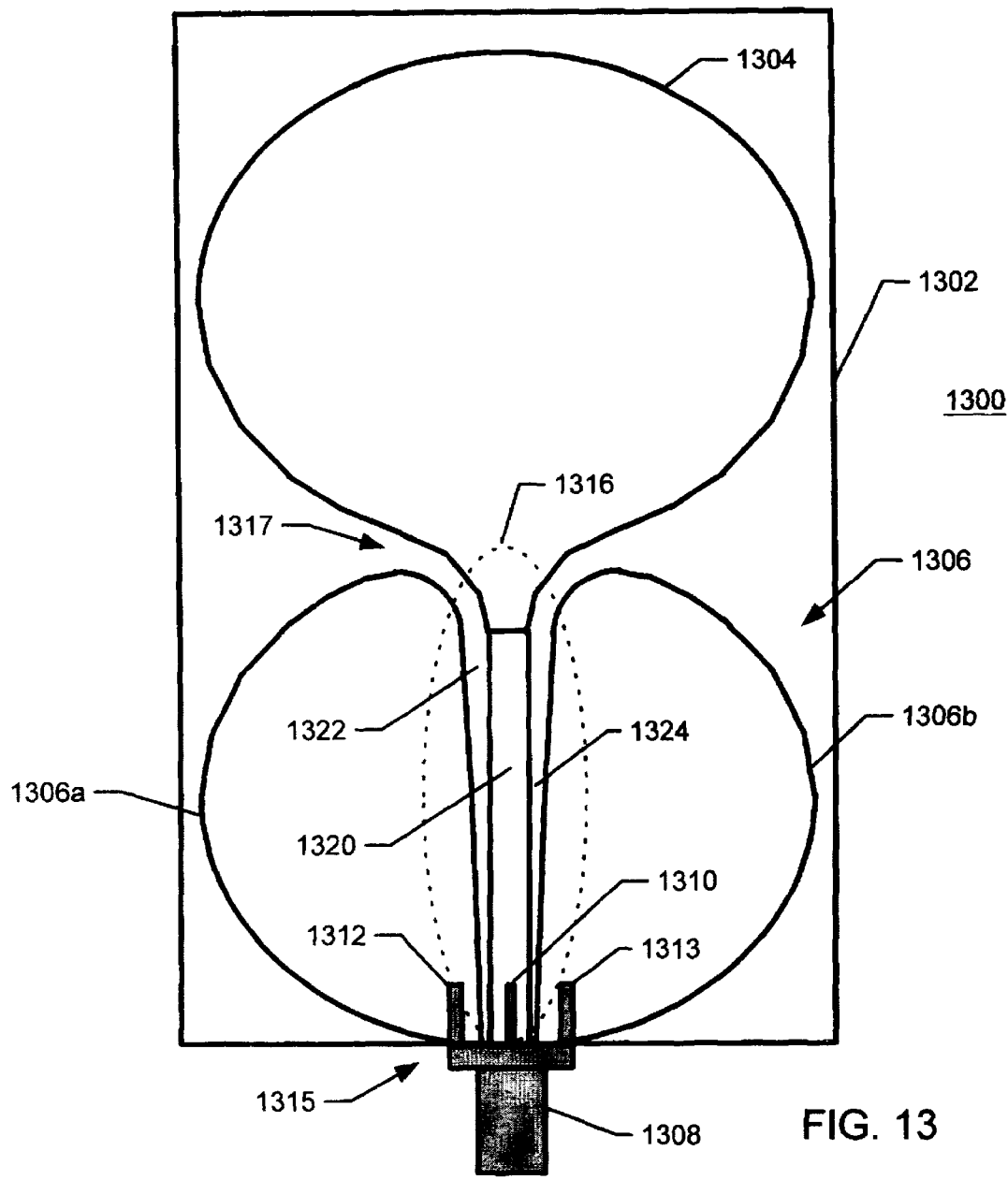
FIG. 13 is a schematic plan view of a planar dipole antenna configured according to the preferred embodiment of the present invention.

FIG. 13 is a schematic plan view of a planar dipole antenna configured according to the preferred embodiment of the present invention. In FIG. 13, an antenna assembly 1300 includes a substantially planar substrate 1302 and radiating elements 1304, 1306 arrayed on substrate 1302. Radiating elements 1304, 1306 are preferably substantially planar and made of electrically conductive material, such as copper. Radiating elements 1304, 1306 are preferably adhered to or otherwise affixed upon substrate 1302. Radiating element 1304 is coupled with a feed structure 1320. Preferably, radiating element 1304 and feed structure 1320 are integrally formed in a single conductive piece. Feed structure 1320 comprises a transition structure that preferably divides radiating element 1306 into two sections 1306a, 1306b and establishes a separation 1322 between section 1306a and feed structure 1320 and a separation 1324 between section 1306b and feed structure 1320.

A signal supply 1308 couples antenna assembly 1300 with a host device (not shown in FIG. 13). Signal supply 1308 is preferably a coaxial connector of the sort represented in FIG. 11 (e.g., coaxial connector 1158). Signal supply 1308 is connected with feed structure 1320 via a center pin 1310. Signal supply 1308 is connected with section 1306a of radiating element 1306 via a ground pin 1312 and signal supply 1308 is connected with section 1306b of radiating element 1306 via a ground pin 1313. Connecting center pin 1310 with feed structure 1320 effects connection of center pin 1310 with radiating element 1304.

Preferably separations 1322, 1324 vary from a narrow expanse proximate signal supply 1308 to a relatively wider expanse distal from signal source 1308 and proximate to radiating element 1304. Thus, separations 1322, 1324 operate to vary impedance from a relatively lower value proximate with signal supply 1308 to a relatively higher value proximate with radiating element 1304. It is in this varying of expanse of separations 1322, 1324 and the consequent variance of impedance that feed structure 1320 operates as a transition element in effecting coupling between antenna assembly 1300 and signal supply 1308. Thus, a feed region 1316 is established over a feed distance from a first connection locus 1315 proximal with signal supply 1308 to a second connection locus 1317 proximal with radiating structure 1304. One may alter the variance maximum and minimum of separations 1322, 1324, or one may alter the rate of change of the variance over the feed distance, or one may effect both such alterations in adjusting the impedance of the coupling between antenna assembly 1300 and signal supply 1308.

It is this capability to directly affect impedance matching by making such alterations in expanses of separations 1322, 1324 that allows more independent adjustment of eccentricity of radiating elements 1304, 1306 in designing antenna assembly 1300. The improved structure of the present invention enables one to directly affect impedance matching independently of adjusting eccentricity of radiating elements 1304, 1306. This difference in design flexibility allows one to require less eccentricity to accomplish a given impedance matching than was required using the prior art design (e.g., FIGS. 11, 12). This is so because at least a portion of the adjustment for improved impedance matching may be accomplished by adjusting expanses of separations 1322, 1324 independently of adjusting eccentricity of radiating elements 1304, 1306.

Figure 14:
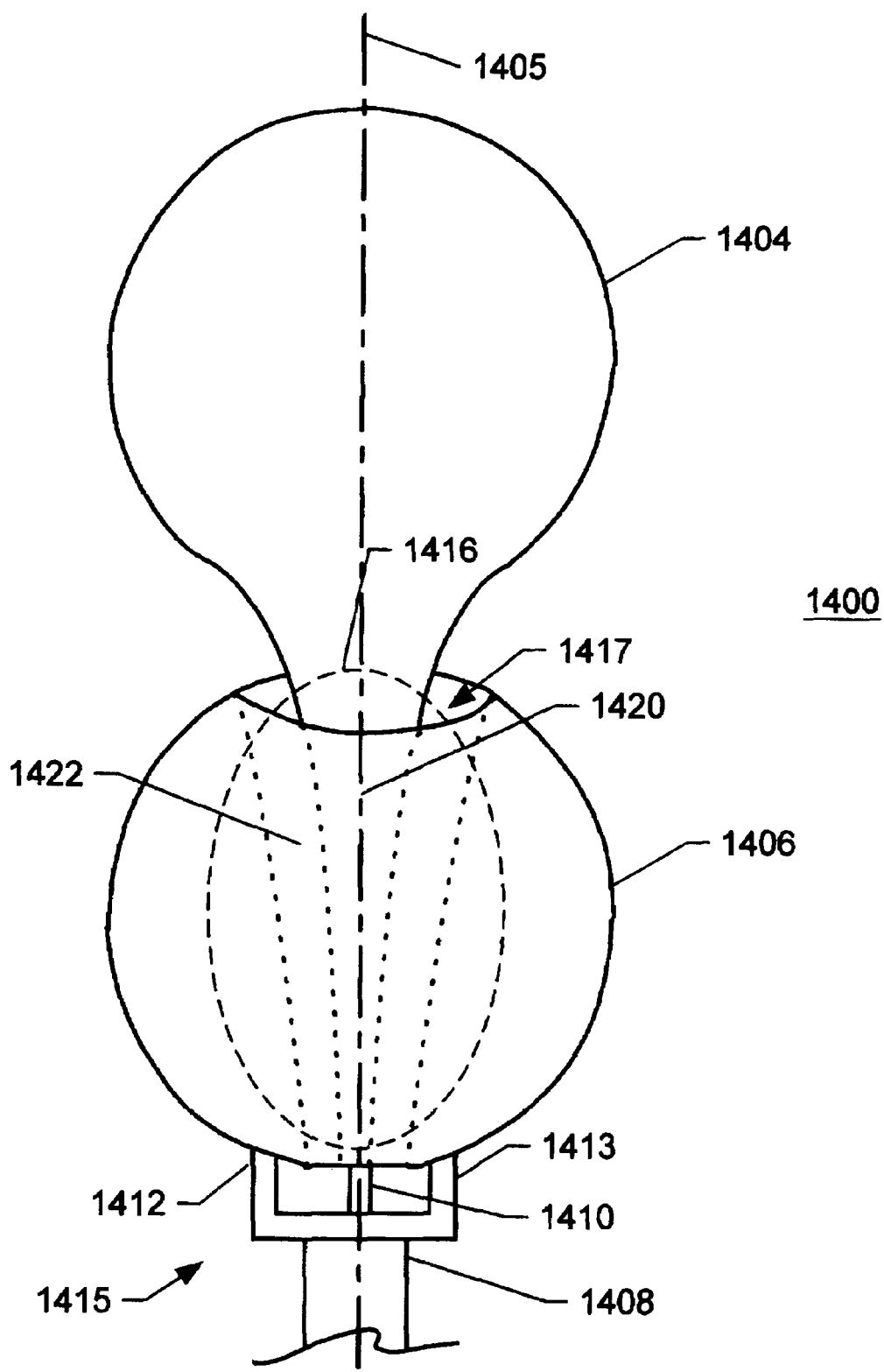
FIG. 14 is a schematic perspective view of a spheroidal dipole antenna configured according to the present invention.

FIG. 14 is a schematic perspective view of a spheroidal dipole antenna configured according to the present invention. In FIG. 14, an antenna assembly 1400 three-dimensional radiating elements 1404, 1406. Preferably radiating elements 1404, 1406 are spheroidal or ellipsoidal in shape, coaxially situated on an axis 1405 and made of electrically conductive material, such as copper. Radiating element 1404 is coupled with a feed structure 1420. Preferably, radiating element 1404 and feed structure 1420 are integrally formed in a single conductive piece. Feed structure 1420 comprises a transition structure that preferably traverses radiating element 1406 along axis 1405 and establishes a separation 13422 between section 1406 and feed structure 1420.

A signal supply 1408 couples antenna assembly 1400 with a host device (not shown in FIG. 14). Signal supply 1408 is preferably a coaxial signal line of the sort represented in FIG. 11 (e.g., coaxial connector 1158). Signal supply 1408 is connected with feed structure 1420 via a center pin 1410. Signal supply 1408 is connected with radiating element 1406 via at least one of a ground pin 1412 and a ground pin 1413. Connecting center pin 1410 with feed structure 1420 effects connection of center pin 1410 with radiating element 1404.

Preferably separation 1422 varies from a narrow expanse proximate signal supply 1408 to a relatively wider expanse distal from signal source 1408 and proximate to radiating element 1404. Thus, separation 1422 operates to vary impedance from a relatively lower value proximate with signal supply 1408 to a relatively higher value proximate with radiating element 1404. It is in this varying of expanse of separation 1422 and the consequent variance of impedance that feed structure 1420 operates as a transition element in effecting coupling between antenna assembly 1400 and signal supply 1408. Thus, a feed region 1416 is established over a feed distance from a first connection locus 1415 proximal with signal supply 1408 to a second connection locus 1417 proximal with radiating structure 1404. One may alter the variance maximum and minimum of separation 1422, or one may alter the rate of change of the variance over the feed distance, or one may effect both such alterations in adjusting the impedance of the coupling between antenna assembly 1400 and signal supply 1408.

It is this capability to directly affect impedance matching by making such alterations in expanse of separation 1422 that allows more independent adjustment of eccentricity of radiating elements 1404, 1406 in designing antenna assembly 1400. The improved structure of the present invention enables one to directly affect impedance matching independently of adjusting eccentricity of radiating elements 1404, 1406. This difference in design flexibility allows one to require less eccentricity to accomplish a given impedance matching than was required using the prior art design (e.g., FIGS. 11, 12 and three-dimensional versions of such prior art antenna design). This is so because at least a portion of the adjustment for improved impedance matching may be accomplished by adjusting expanse of separation 1422 independently of adjusting eccentricity of radiating elements 1404, 1406. A variety of suitable radiating elements may be generated, for example, from surfaces of revolution that may be obtained by rotating the characteristic planar elements of FIG. 9 about their semi-minor axes 914a–d. In a preferred embodiment, radiating elements 1404 and 1406 are ellipsoids of revolution whose semi-major and semi-minor axes are in a ratio of approximately 1.5:1. This yields a shape which is approximately conformal to the natural contours of energy flow around an ideal dipole. Further, such a shape significantly reduces undesired reactive energy and gives rise to the desired ultra-wideband response and excellent impedance matching.

Antennas with feed regions similar to feed region 1416 have been used in the past, as disclosed for example by Brillouin in U.S. Pat. No. 2,454,766 (issued Nov. 30, 1948). Brillouin used a tapered coaxial feed with a coaxial horn antenna having a propagation path extending to the edges, or rims of the horn structures of his antenna. Brillouin did not teach or suggest using a tapered coaxial feed structure with a dipole antenna as shown in FIG. 14.

There is also a third significant consideration that must be taken into account in designing ultra-wide band planar dipole antennas: current induced in the signal supply, such as sheath current induced on a coaxial signal supply line. Sheath currents occur whenever a dipole antenna (an inherently balanced structure) is fed by a coaxial line (an inherently unbalanced structure) or a similarly unbalanced feed line. Sheath currents may also be caused when feed lines are improperly routed through regions in which radiation fields pass. Sheath currents generally make it difficult to achieve better than about 10 dB isolation between the operating band of an antenna and the lower frequency "stop band" in which the antenna is not intended to operate. Because antenna cables carrying sheath currents are radiators of energy, overall system performance becomes difficult to predict, and undesired out-of-band radiation may occur.

A further benefit is realized by the structure of the present invention in that the ability to control antenna impedance to a high degree of precision allows accurate design control of antenna gain roll off at the edge of the pass band of the antenna. Varying the impedance taper of the transformation structure of the present invention allows a designer to vary the rate of roll-off from a gentle slope (e.g., about –10 dB per octave) to a steeper slope (e.g., about –20 dB per octave). Thus, the present invention's provision of a variable impedance input coupling to an antenna facilitates use of the antenna itself as a broadband filter device with a variable roll-off characteristic.

A still further benefit of the present invention is the relatively small size of the antenna. The minor axis has a size that is roughly 0.125 wavelength at the lower end of the operating band. This is about half the size of the usual quarter wave structure previously believed in the art to be necessary for efficient performance.

In addition, if a narrow band implementation of the present invention is desired, there are a variety of methods known in the art to reduce the upper operating frequency while maintaining the same lower operating frequency. These include but are not necessarily limited to introducing a frequency dependent loss, or another means for effecting low pass filtering. This would allow an antenna designer to use the present teachings to create very small, very efficient narrow band antennas.

Figure 15:
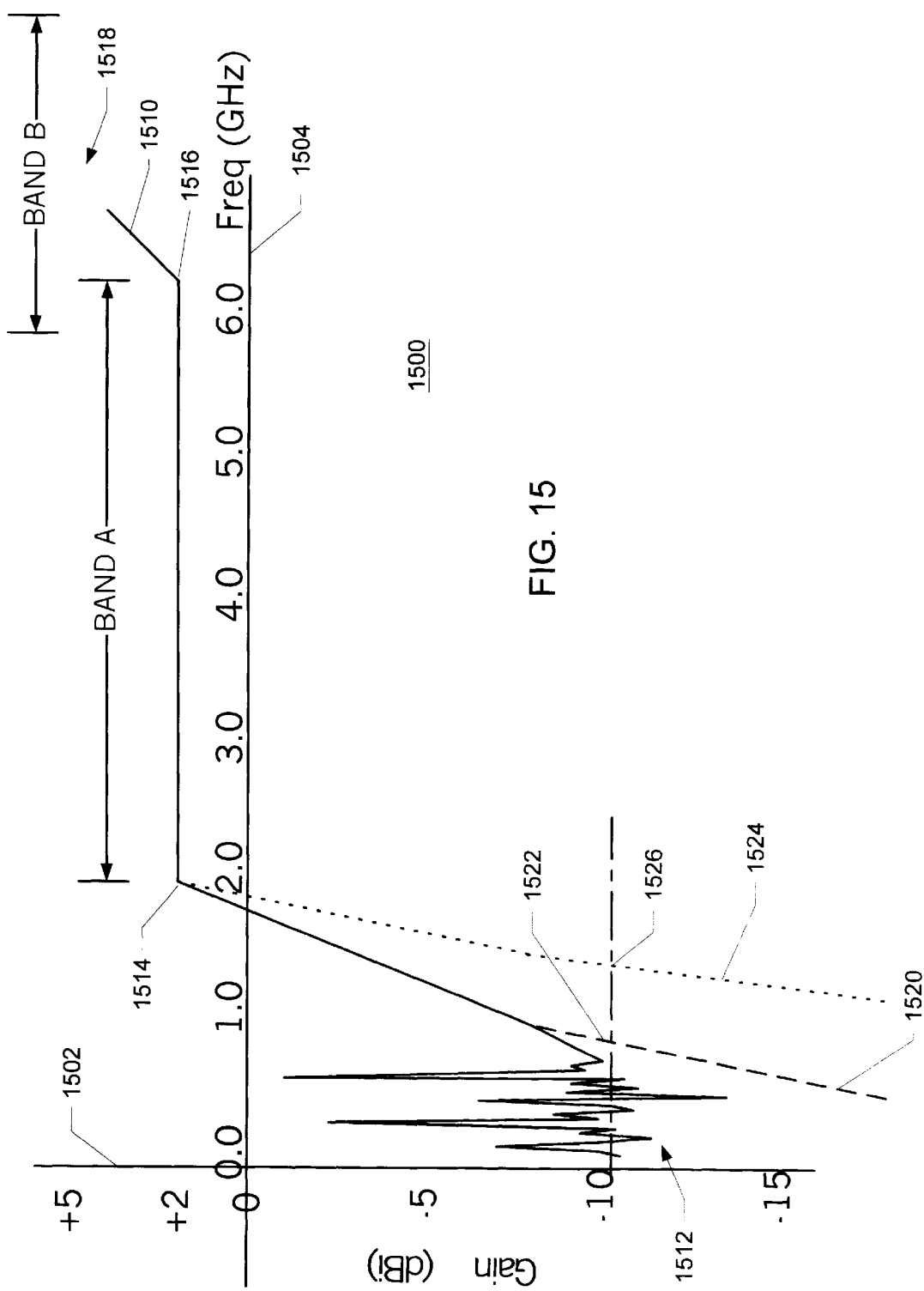
FIG. 15 is a graphic representation of a typical relationship between antenna gain and signal frequency for antennas configured according to the teachings of the present invention, including adjustment of gain roll-off for such antennas.

FIG. 15 is a graphic representation of a typical relationship between antenna gain and signal frequency for antennas configured according to the teachings of the present invention, including adjustment of gain roll-off for such antennas. In FIG. 15, a graphic chart 1500 plots antenna gain for a representative ultra-wide band (UWB) antenna on an axis 1502 versus operating frequency of the antenna on an axis 1504. Thus, gain response as a function of frequency is represented by a response curve 1510 on chart 1500. Values displayed on axes 1502, 1504 are representative and are not intended to limit the scope of the disclosure. For example, an antenna designer can obtain an antenna according to the teachings of the present invention in a different desired operating band by scaling the physical dimensions of the antenna appropriately.

Response curve 1510 extends from a lower—frequency region 1512 to an upper—frequency region 1518 to establish an operating band "A" and an operating band "B". Operating band "A" extends from about 2 GHz to about 6 GHz and represents a normal UWB dipole operating band. Operating band "B" extends upward in frequency from about 6 GHz and represents an operating band in which quadrupole operation may be experienced. The wide swings in gain as a function of frequency in lower region 1512 represent variations in gain caused by poor isolation in a signal supply, such as sheath currents in a coaxial cable signal supply. Dotted line curve 1522 represents a relatively gentle gain roll-off of about −10 dB per octave from operating band "A" for one geometry of feed region (e.g., feed region 1316, FIG. 13; or 1416, FIG. 14) with a given separation (e.g., separations 1322, 1324, FIG. 13; separation 1422, FIG. 14) between radiating element(s) and a feed structure (e.g., feed structure 1320, FIG. 13; feed structure 1420, FIG. 14).

Dotted line curve 1524 represents a relatively sharper gain roll-off of about −20 dB per octave from operating band "A" for another geometry of feed region (e.g., feed region 1316, FIG. 13; or 1416, FIG. 14) with another given separation (e.g., separations 1322, 1324, FIG. 13; separation 1422, FIG. 14) between radiating element(s) and a feed structure (e.g., feed structure 1320, FIG. 13; feed structure 1420, FIG. 14). Such a capability to adjust gain roll-off enables an antenna designer to avoid noisy areas such as the wide swings in gain in lower region 1512 caused by poor isolation in a signal supply, such as sheath currents in a coaxial cable signal supply, as illustrated by dotted line curve 1524.

Figure 16:
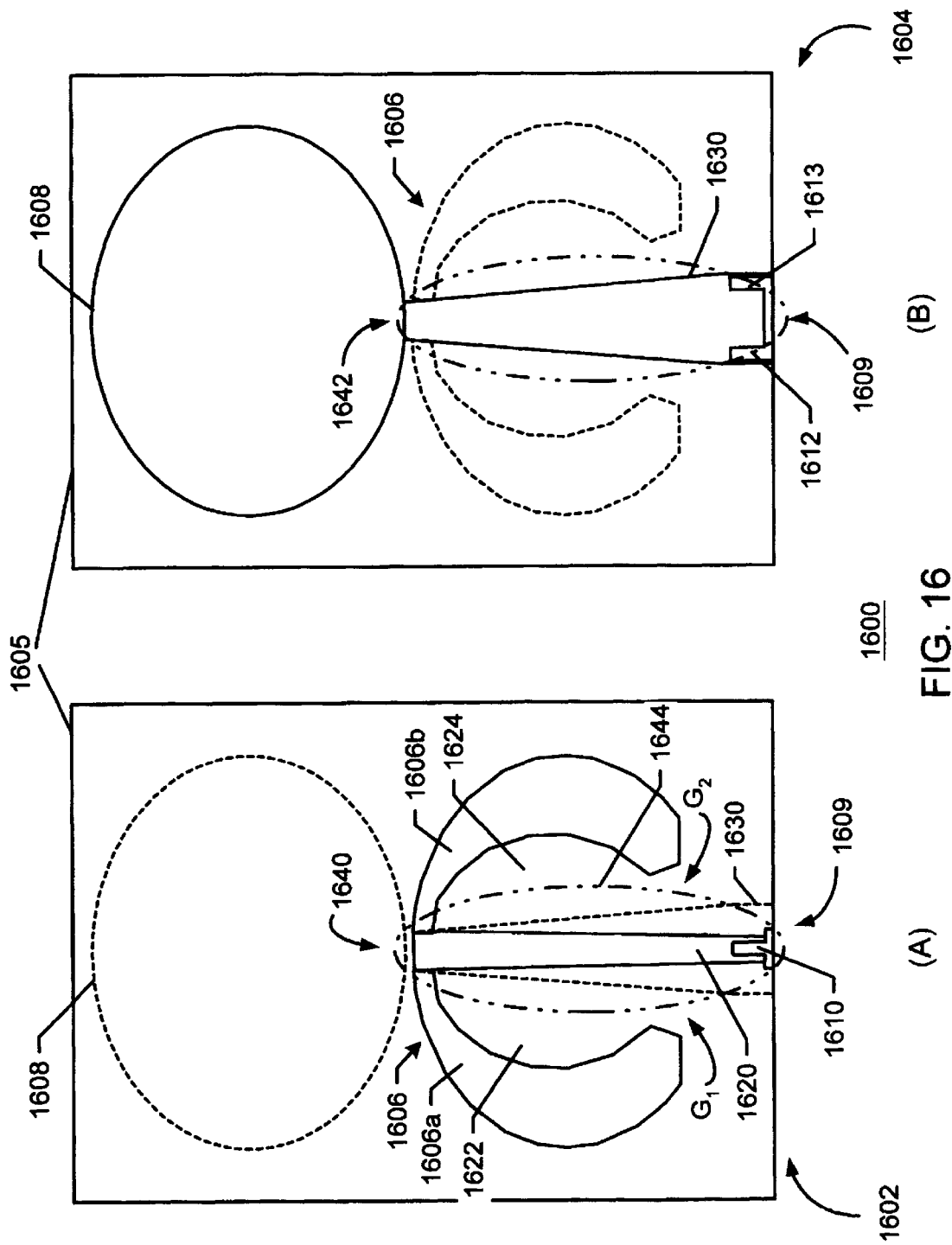
FIG. 16 is a schematic plan view of a planar dipole antenna configured according to an alternate embodiment of the present invention.

FIG. 16 is a schematic plan view of a planar dipole antenna configured according to an alternate embodiment of the present invention. The alternate embodiment of the present invention illustrated in FIG. 16 includes a balun transformer structure in the antenna feed region. A balun is a special kind of transformer that transforms an unbalanced transmission line to a balanced transmission line. If an unbalanced line is used to drive a balanced antenna, the resulting feed asymmetry leads to undesired currents and reflection back down the transmission line. A balun allows an unbalanced feed structure to be coupled with a balanced antenna without such unwanted effects. Such a balun embodiment is useful, for example, when sheath currents are likely to cause problems or when good stop band protection is desired. In FIG. 16, a first side 1602 of an antenna assembly 1600 is illustrated in FIG. 16 (A), and a second side 1604 of antenna assembly 1600 is illustrated in FIG. 16(B). Second side 1604 is opposite to first side 1602.

Antenna assembly 1600 includes a substantially planar substrate 1605 with radiating elements 1606, 1608 arrayed on substrate 1605. Radiating elements 1606, 1608 are preferably substantially planar and made of electrically conductive material, such as copper. Radiating element 1606 is preferably adhered to or otherwise affixed upon first side 1602 of substrate 1605. Radiating element 1608 is preferably adhered to or otherwise affixed upon second side 1604 of substrate 1605.

Radiating element 1606 is coupled with a first feed structure 1620. Preferably, radiating element 1606 and first feed structure 1620 are integrally formed in a single conductive piece on first side 1602 of antenna assembly 1600. First feed structure 1620 divides radiating element 1606 into two sections 1606a, 1606b and establishes a separation 1622 between section 1606a and first feed structure 1620 and a separation 1624 between section 1606b and first feed structure 1620. An isolation gap G1 is established between first feed structure 1620 and section 1606a, and an isolation gap G2 is established between first feed structure 1620 and section 1606b. Isolation gaps G1, G2 must be sufficiently wide to preclude undesired coupling among first feed structure 1620 and sections 1606a, 1606b.

Radiating element 1608 is coupled with a second feed structure 1630. Preferably, radiating element 1608 and second feed structure 1630 are integrally formed in a single conductive piece on second side 1604 of antenna assembly 1600. Second feed structure 1630 is preferably substantially symmetrically situated on second side 1604 with respect to first feed structure 1620 on first side 1602.

Signal supply 1609 couples antenna assembly 1600 with a host device (not shown in FIG. 16). Signal supply 1609 is preferably a coaxial connector of the sort represented in FIG. 11 (e.g., coaxial connector 1158). Signal supply 1609 is connected with first feed structure 1620 via a center pin 1610. Signal supply 1609 is connected with second feed structure 1630 via ground pins 1612, 1613. Connecting center pin 1610 with first feed structure 1620 effects connection of center pin 1610 with radiating element 1606 because sections 1606a, 1606b are coupled with first feed structure 1620 on first side 1602 at connection locus 1640. Connecting ground pins 1612, 1613 with second feed structure 1630 effects connection of ground pins 1612, 1613 with radiating element 1608 because radiating element 1608 is coupled with second feed structure 1630 on second side 1604 at connection locus 1642. Thus, feed structures 1620, 1630 cooperate to establish a feed region 1644 for antenna assembly 1600.

Second feed structure 1630 has a wider expanse than first feed structure 1620 at a locus proximate with a signal supply 1609. Second feed structure 1630 converges to a narrower width at coupling locus 1642. First feed structure 1620 has a narrower expanse than second feed structure 1630 at a locus proximate with a signal supply 1609. First feed structure 1620 diverges to a wider width at coupling locus 1640. The convergence—divergence of widths of feed structures 1620, 1630 provide a capability for balancing signals applied at signal supply 1609. Widths of feed structures 1620, 1630 at their respective connection loci 1640, 1642 affect coupling impedance of antenna assembly 1600.

Thus, antenna assembly 1600 provides substantially independent adjustment of signal balance (i.e., by adjusting convergence—divergence of feed structures 1620, 1630) and adjustment of coupling impedance (i.e., by adjusting widths of joining between feed structures 1620, 1630 and radiating elements 1606, 1608 at connection loci 1640, 1642).

It is this capability to substantially independently affect impedance matching and signal balance that allows more independent adjustment of eccentricity of radiating elements 1606, 1608 in designing antenna assembly 1600. The improved structure of the present invention enables one to substantially independently affect impedance matching, signal balance and eccentricity of radiating elements 1606, 1608. This difference in design flexibility allows one to require less eccentricity to accomplish a given impedance matching while still efficiently coupling an unbalanced signal feed with a balanced antenna than was required using the prior art design (e.g., FIGS. 11, 12). This is so because at least a portion of the adjustment for improved impedance matching and balanced coupling may be accomplished by adjusting convergence—divergence of feed structures 1620, 1630, and by adjusting widths of joining between feed structures 1620, 1630 and radiating elements 1606, 1608 at connection loci 1640, 1642.

Thus, in summary, there are three principal significant design considerations that should be taken into account in designing an ultra-wide band (UWB) antenna: (1) if an omni-directional propagation pattern is desired, antenna radiation elements should be less eccentric (i.e., more circular) in shape; (2) if good impedance matching is desired, antenna radiation elements should be more eccentric (i.e., less circular) in shape; and (3) if reliable performance and good stop band isolation are desired, feed line sheath currents must be kept small.

Prior art antenna designs have largely comprised attaching a signal supply (e.g., a coaxial cable) to a slot line between two antenna radiating elements and living with whatever performance is provided by the arrangement. Eccentricity of radiating elements could be increased to improve impedance matching, but only at the expense of uniformity of propagation pattern. Thus, a designer had to strive to "strike a balance" between desired impedance matching and uniformity of propagation. Shortcomings in either parameter had to be made up using techniques external to the antenna structure. Such external techniques included, by way of example, resistively loading the input impedance to improve impedance matching or providing selected reflection structures to reshape propagation patterns. Resistive loading adversely affects antenna efficiency; reflection can help aim propagation in a given direction, but it is not a solution for providing omni-directional propagation.

The present invention provides a structure for coupling a signal supply (such as a coaxial line) with antenna radiation elements that permits a more forgiving transformation in the feed region of the antenna structure than is established by prior art structures. By establishing such an impedance transformation region a designer is provided with a structure that can be varied to more directly affect impedance matching than can be effected merely by varying eccentricity of radiating elements. The result is that, while eccentricity still affects uniformity of propagation and impedance matching (as it does in the case of earlier antenna designs), there is an additional adjustment provided by the present invention that more directly affects impedance matching. As a consequence, eccentricity may now be skewed closer to the circular shape desired to facilitate uniformity of propagation than was previously achievable, while still attaining acceptable impedance matching for an antenna design. What occurs, in effect, is a "pulling" into the feed region of the gradual transition exhibited by eccentric elliptical radiating elements. As a happy consequence, the better impedance matching provided by a more eccentric elliptical radiating element can now be realized while employing a less eccentric more circular radiating element to effect acceptable uniformity in signal propagation.

Yet a further benefit of the present invention is that cable current can be significantly reduced by routing the feed supply of the present invention along the axis of the antenna. Such an orientation of the feed supply avoids placing the feed supply in the direct path of radiated fields, thus reducing the incidence of sheath currents in the feed supply.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for coupling a balanced antenna with a signal line; said signal line having at least two signal line coupling loci for delivering a signal having at least two unbalanced signal components; said antenna having at least two antenna coupling loci for receiving signals; the apparatus comprising:
   (a) a first feed element; said first feed element being coupled with a first signal line coupling locus of said at least two signal line coupling loci; said first feed element conveying a first signal component of said at least two signal components along a first feed element length to a first antenna coupling locus of said at least two antenna coupling loci; and
   (b) a second feed element; said second feed element being coupled with a second signal line coupling locus of said at least two signal line coupling loci; said second feed element conveying a second signal component of said at least two signal components along a second feed element length to a second antenna coupling locus of said at least two antenna coupling loci;
   said first signal component and said second signal component differing in at least one parameter by an imbalance; said first feed element and said second feed element being separated by a dielectric gap; said first feed element and said second feed element being mutually asymmetric; said mutual asymmetry being configured to reduce said imbalance as said first signal component and said second signal component traverse the apparatus intermediate said signal line and said antenna; said first feed element and said second feed element each being a substantially planar quadrilateral land; said first feed element having a first signal coupling width neighboring said first signal line coupling locus and having a first antenna coupling width neighboring said first antenna coupling locus; said second feed element having a second signal coupling width neighboring said second signal line coupling locus and having a second antenna coupling width neighboring said second antenna coupling locus; said first signal coupling width and said second signal coupling width being unequal by a signal coupling width difference.

2. An apparatus for coupling a balanced antenna with a signal line as recited in claim 1 wherein said first antenna coupling width and said second antenna coupling width are unequal by an antenna coupling width difference.

3. An apparatus for coupling a balanced antenna with a signal line as recited in claim 2 or 4 wherein said mutual asymmetry is configured to reduce said imbalance by at least one of said signal coupling width difference and said antenna coupling width difference.

4. An apparatus for coupling a balanced antenna with a signal line as recited in claim 1 through 4 wherein said first feed element and said second feed element are substantially coplanar and wherein said dielectric gap is an air gap intermediate said first feed element and said second feed element.

5. An apparatus for coupling a balanced antenna with a signal line as recited in claim 1 through 4 wherein said first feed element is situated on a first side of a dielectric substrate and wherein said second feed element is situated on a second side of said dielectric substrate; said dielectric substrate having a thickness separating said first side and said second side; said thickness establishing said dielectric gap.

6. An apparatus for coupling a balanced antenna with a signal line as recited in claim 1 wherein said mutual asymmetry is configured to reduce said imbalance by said signal coupling width difference.

7. An apparatus for coupling a balanced antenna with a signal line; said signal line having at least two signal line coupling loci for delivering a signal having at least two unbalanced signal components; said antenna having at least two antenna coupling loci for receiving signals; the apparatus comprising:

(a) a first feed element; said first feed element being coupled with a first signal line coupling locus of said at least two signal line coupling loci; said first feed element conveying a first signal component of said at least two signal components along a first feed element length to a first antenna coupling locus of said at least two antenna coupling loci; and (b) a second feed element; said second feed element being coupled with a second signal line coupling locus of said at least two signal line coupling loci; said second feed element conveying a second signal component of said at least two signal components along a second feed element length to a second antenna coupling locus of said at least two antenna coupling loci;

said first signal component and said second signal component differing in at least one parameter by an imbalance; said first feed element and said second feed element being separated by a dielectric gap; said first feed element and said second feed element being mutually asymmetric; said mutual asymmetry being configured to reduce said imbalance as said first signal component and said second signal component traverse the apparatus intermediate said signal line and said antenna; said first feed element and said second feed element each being a substantially planar quadrilateral land; said first feed element having a first signal coupling width neighboring said first signal line coupling locus and having a first antenna coupling width neighboring said first antenna coupling locus; said second feed element having a second signal coupling width neighboring said second signal line coupling locus and having a second antenna coupling width neighboring said second antenna coupling locus; said first antenna coupling width and said second antenna coupling width being unequal by an antenna coupling width difference.

8. An apparatus for coupling a balanced antenna with a signal line as recited in claim 7 wherein said first signal coupling width and said second signal coupling width are unequal by a signal coupling width difference.

9. An apparatus for coupling a balanced antenna with a signal line as recited in claim 7 wherein said mutual asymmetry is configured to reduce said imbalance by said antenna coupling width difference.

10. An apparatus for establishing signal coupling between a signal line and an antenna structure; said antenna structure including a first radiating element on a first side of a dielectric substrate and a second radiating element on a second side of said substrate; said first radiating element having a first antenna coupling locus; said second radiating element having a second antenna coupling locus; said signal line having two signal line coupling loci for delivering a signal having two unbalanced signal components; the apparatus comprising:

(a) a first feed element on said first side of said substrate; said first feed element being a first substantially planar polygonal land and coupling said first antenna coupling locus with a first signal line coupling locus of said two signal line coupling loci; said first feed element establishing a first antenna coupling width at said first antenna coupling locus and establishing a first signal coupling width at said first signal line coupling locus; and (b) a second feed element on said second side of said substrate; said second feed element being a second substantially planar polygonal land and coupling said second antenna coupling locus with a second signal line coupling locus of said two signal line coupling loci; said second feed element establishing a second antenna coupling width at said second antenna coupling locus and establishing a second signal coupling width at said second signal line coupling locus;

said first antenna coupling width, said second antenna coupling width, said first signal coupling width and said second signal coupling width cooperating to establish an asymmetry between said first feed element and said second feed element; said asymmetry operating to reduce imbalance between said two unbalanced signal components.

11. An apparatus for establishing signal coupling between a signal line and an antenna structure as recited in claim 10 wherein said asymmetry operates to modulate said two unbalanced signal components to present balanced signal components at said first antenna coupling locus and said second antenna coupling locus.

12. An apparatus for establishing signal coupling between a signal line and an antenna structure as recited in claim 11 wherein said substrate is substantially planar.

13. An apparatus for establishing signal coupling between a signal line and an antenna structure as recited in claim 12 wherein said substrate is substantially inflexible.

14. An apparatus for establishing signal coupling between a signal line and an antenna structure as recited in claim 10 wherein said substrate is substantially planar.

15. An apparatus for establishing signal coupling between a signal line and an antenna structure as recited in claim 14 wherein said substrate is substantially inflexible.

* * * * *